Oct. 10, 1961   D. SHEFFET   3,004,206
REGULATED POWER SUPPLY
Filed Jan. 26, 1959
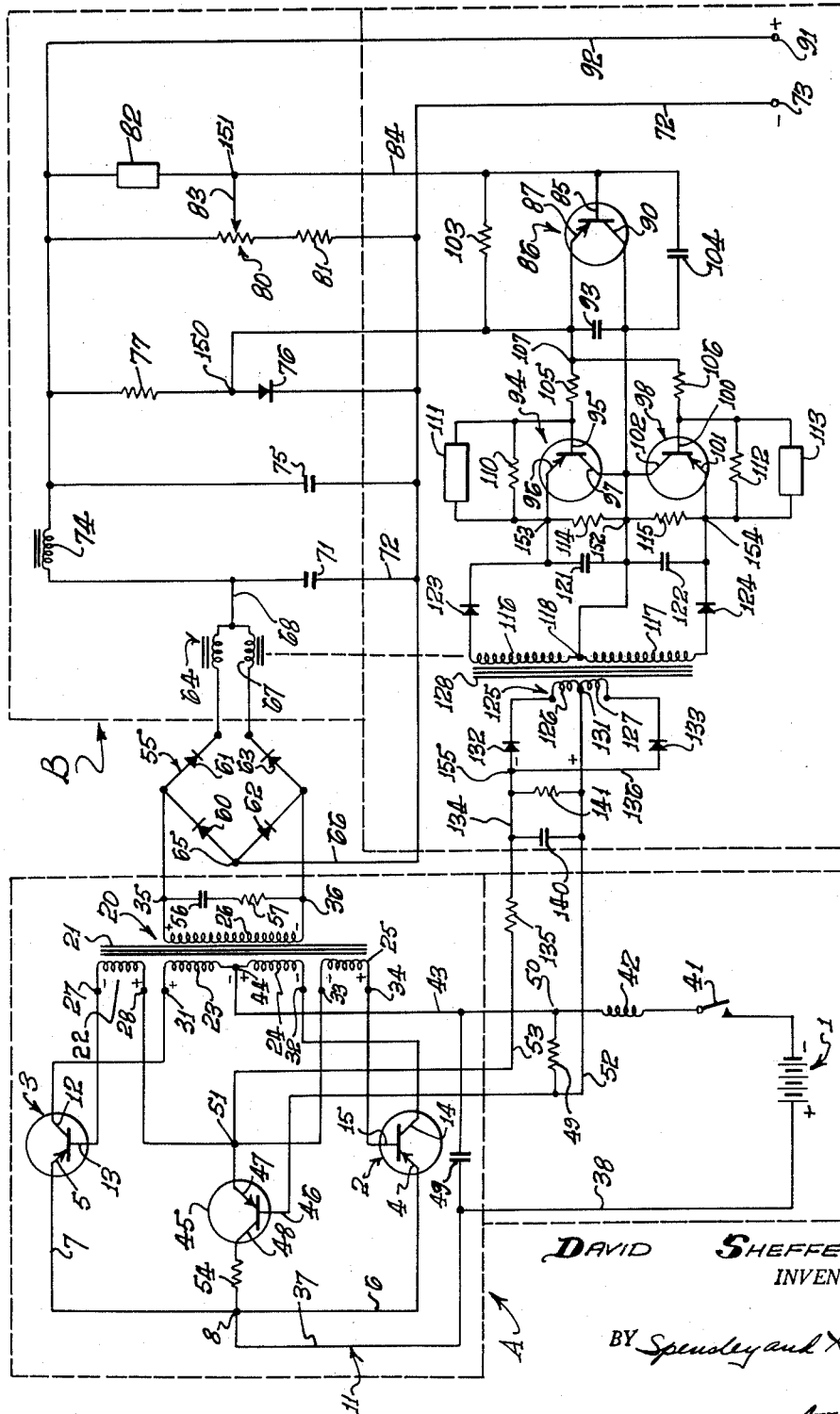
DAVID SHEFFET,
INVENTOR.
BY Spensley and Horn
ATTORNEYS.

United States Patent Office

3,004,206
Patented Oct. 10, 1961

3,004,206
REGULATED POWER SUPPLY
David Sheffet, Altadena, Calif., assignor to Western Geophysical Company of America, Los Angeles, Calif., a corporation of Delaware
Filed Jan. 26, 1959, Ser. No. 788,922
6 Claims. (Cl. 321—2)

This invention relates to a transistor circuit and more particularly to a transistor circuit for regulating a direct current power supply.

An object of the present invention is to provide an improved transistor circuit for regulating the voltage from a voltage source to a variable load.

Another object of the present invention is to provide a transistor circuit for regulating the voltage from a variable voltage source to a variable load.

Yet another object of this invention is to provide a transistor circuit for regulating a voltage source which includes a magnetic core.

Still another object of the present invention is to provide a transistor circuit for producing a regulated direct current output which is reliably operable through the temperature range from −40° F. to +140° F.

A further object of the present invention is to provide an improved circuit including a plurality of transistors which provides for protection against an inadvertent polarity reversal of the input terminals.

Yet a further object of the present invention is to provide a regulated power supply of the character described which is protected against a short circuit in the output circuit.

A still further object of the present invention is to provide a power supply of the character described which has improved regulation characteristics.

The novel features which are believed to be characteristic of the invention, both as to its apparatus and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In accordance with the present invention, an inverter circuit consisting of a pair of transistors which alternately conduct, serves to convert a low direct current input voltage to a square wave output voltage. The square wave output voltage is stepped up in magnitude through a transformer and is then converted into a pulsating direct current voltage by a bridge rectifier circuit. This direct current voltage is regulated by a transistorized regulator which receives its power from the output of the bridge circuit through the magnetic coupling of a magnetic regulator. Further, the voltage from the magnetic regulator is also used to control the conduction of another transistor which is coupled to the inverter circuit for controlling its power output.

In the drawing there is shown a schematic circuit diagram in accordance with the presently preferred embodiment of the invention. For purposes of clarity and simplicity of explanation the present invention will be described assuming a 12 volt direct current input voltage and a 150 volt direct current output voltage.

As shown in the drawing, there is provided a suitable voltage source 1 which produces a unidirectional output voltage with a polarity as indicated. The inverter circuit generally indicated by the box A includes a pair of transistors 2 and 3 which are connected to the source 1. The emitters 4 and 5 of transistors 2 and 3 are interconnected by means of leads 6 and 7 at terminal 8. Terminal 8 is in turn connected through lead 11 to the positive terminal of the input source 1. The transistors 2 and 3 as well as the other transistors in the circuit, not yet discussed, are all PNP transistors although NPN transistors may be utilized equally as well.

The transistor 3 includes an emitter electrode 5, a collector electrode 12, and a base electrode 13 while transistor 2 is a matching transistor including emitter electrode 4, collector electrode 14, and base electrode 15. The inverter circuit further includes a saturable magnetic core means 20. The core means 20 includes a magnetic core 21 which is constructed of a material designed for magnetic saturation within the range of energization of the core means 20. Preferably, the material utilized in the core 21 is of a type having a narrow rectangular hysteresis loop. One such material is manufactured by the Arnold Engineering Company of Marengo, Illinois, under the trademark Deltamax.

The core means 20 includes windings 22, 23, 24, 25 and 26. The winding 22 is provided with a pair of terminals 27 and 28. The windings 23 and 24 are two halves of a unitary center tapped winding which includes end terminals 31 and 32. The windings 22 and 25 are also in fact a unitary center tapped winding. Further, the winding 25 has a pair of terminals 33 and 34. Finally an additional winding 26 which steps up the output voltage from the other windings links the core 21 and includes a pair of terminals 35 and 36.

The terminals 31 and 32 associated with center tapped windings 23 and 24, are connected respectively to the collector electrode 12 of transistor 3 and the collector electrode 14 of transistor 2. Winding 22 has its terminal 27 connected to the base electrode 13 of transistor 3 while its other terminal 28 is connected to the terminal 33 of winding 25. Terminal 34 of winding 25 is connected to the base electrode 15 of transistor 2. The emitter electrodes 4 and 5 of transistors 2 and 3 are each connected over leads 37 and 38 to the positive side of source 1 which is herein assumed to be a 12 volt battery. The opposite or negative side of source 1 is connected through switch 41, filter coil 42, and lead 43 to the center tap 44 of primary windings 23 and 24.

A third PNP transistor 45 including base electrode 46, emitter electrode 47 and collector electrode 48 is included in the inverter circuit as a control element operating in a manner hereinafter to be explained. The emitter electrode 47 is connected to junction 51 of the two inverter feedback windings 25 and 22 which connect to the two base electrodes 15 and 13 of transistors 2 and 3, respectively. The base electrode 46 is connected through resistor 49 to terminal 50 of coil 42. Base electrode 46 also connects to the direct current feedback and regulator circuit designated by the box B by means of lead 52. The junction 51 is also connected to the direct current feedback and regulator circuit over lead 53. Finally, the collector electrode 48 is connected through resistor 54 to the emitters 4 and 5 of transistors 2 and 3. The inverter circuit A provides its square wave output voltage across winding 26 at terminals 35 and 36 which lead to the full wave bridge rectifier 55.

A filter consisting of capacitor 56 and resistor 57 is connected across the inverter circuit output terminals 35 and 36. This filter removes voltage spikes from the square wave. A saturable reactor 64 is connected intermediate to diodes 61 and 63 at the output of the rectifier 55 while the other output terminal 65 has lead 66 connected thereto. The reactor winding 67 is connected by means of lead 68, capacitor 71 and lead 72 to the negative output terminal 73. A coil 74 and another capacitor 75, acts as a filter. Across the filter is a Zener diode 76 and a resistor 77. A potentiometer 80 and series resistor 81 are in turn connected across the Zener diode-resistor arm. Finally, a thermistor 82 and wiper arm 83 of potentiometer 80 are connected to one side of the potentiometer 80 as shown, while the other side of the thermistor 82 is connected to lead 84 which is connected to the base electrode 85 of transistor amplifier 86. The end of the thermistor 82 opposite the wiper arm 83 is connected directly to the positive output terminal 91 by means of lead 92. The transistor 86 further includes an emitter electrode 87 and a collector electrode 90. A capacitor 93 is coupled between the emitter and collector electrodes 87 and 90 of transistor 86. A resistor 103 is connected between the base electrode 85 and the emitter electrode 87 of transistor 86 while a capacitor 104 is connected between the collector electrode 90 and the base electrode 85. Two transistors 94 and 98 which are connected in a push-pull arrangement are coupled to the transistor 86. Transistor 94 includes a base electrode 95, an emitter electrode 96, and a collector electrode 97 while transistor 98 includes a base electrode 100, an emitter electrode 101, and a collector electrode 102.

The base electrodes 95 and 100 of transistors 94 and 98 are each connected through resistors 105 and 106 to terminal 107. Each of the transistors 94 and 98 have connected between their base and emitter electrode a resistor and a thermistor in parallel, resistor 110, and thermistor 111, being associated with transistor 94, while resistor 112 and thermistor 113 is associated with transistor 98. A pair of similar resistors 114 and 115 are further connected intermediate the emitter and collector electrodes of the two transistors under discussion. Windings 116 and 117 which together form a unitary winding are center tapped at terminal 118, and are linked with the core of reactor 64 which is also associated with each of the two transistors 94 and 98.

In parallel with the winding 116 and with resistor 114 is a capacitor 121. Similarly, another capacitor 122 is connected in parallel with winding 117 and resistor 115. A diode 123 is connected in the series loop including the winding 116 and capacitor 121 while another diode 124 is connected in the series loop including the winding 117 and the capacitor 122.

A unitary center tapped winding 125 defines two windings 126 and 127 which have a substantially lesser number of turns than do windings 116 and 117, and is coupled to the latter windings through core means 128. Lead 52 is connected to the center tap terminal 131 of the winding 125. A diode 132 is connected in series with winding 126 while a similar diode 133 is connected in series with winding 127. Also connected to diode 132 over lead 134, is a resistor 135 which is coupled to lead 53. Diode 133 is also connected to lead 134 by means of lead 136. Finally connected in parallel across leads 134 and 52 are a capacitor 140 and resistor 141.

The operation of the circuit in accordance with the present invention will now be explained. The inverter circuit A is energized by closing of switch 41. Let it be assumed that due to initial unbalance in the circuit, that current begins to flow through the emitter 5 to the collector 12 of transistor 3 from the source, over leads 37 and 38. Thus, substantially zero current will flow initially from the source through the emitter 4 to the collector 14 of transistor 2. Under these initial conditions the resistance offered by transistor 3 is substantially less than that offered by transistor 2. Thus, substantially all of the voltage drop of the source 1 will be across winding 23 causing current to flow from the source through the terminal 31 of the winding 23. The current flowing through winding 23 is effective to induce voltage in windings 22 and 25 of such polarity and magnitude as to maintain conduction of transistor 3 in a saturated condition, and to maintain cut-off of transistor 2. As was previously mentioned, the core 21 possesses a rectangular hysteresis loop. When the source 1 is initially applied across the winding 23 as herein-above described, a magneto-motive force is established for directing magnetic flux through the core 21 which increases substantially linearly with respect to time. The increasing magnetic flux serves to induce voltage in the associated windings 22, 24, 25 and 26 of substantially constant magnitude. The connections of the winding are selected to cause the polarities of the induced voltage to be as indicated in the drawing. The windings 22 and 25 are proportioned so that voltages induced therein drive the emitter 4 of transistor 2 sufficiently positive with respect to its base 15 while driving the base 13 of transistor 3 sufficiently positive with respect to emitter 5 that both transistors 3 and 2 are momentarily cut-off. As the magnetic flux in the core 21 increases by reason of continued current flow from the source 1 through the winding 23, the core approaches a saturated condition with the result that there is substantially no further increase in the magnetic flux in the core and substantially zero voltages are induced in all of the windings thereby placing both of the transistors under discussion in a non-conducting condition. This results in the winding 23 being effectively disconnected from the source and substantially zero current flows through this winding therefore substantially zero magnetomotive force is applied to the core 21.

As the magnetomotive force falls from a value sufficient to effect saturation of the core to a zero value the magnetic flux in the core is reduced. This reduction is effective to induce voltage in the windings 22 and 25, having polarities which are opposite those shown in the drawing. Thus, transistor 3 will be maintained at cut-off while transistor 2 will begin to conduct. When the transistor 2 begins to conduct, current from source 1 will flow through transistor 2 into terminal 32 and through the winding 24. This current establishes a magnetomotive force which directs magnetic flux through the core 21 in the direction opposite that previously described with reference to the energization of winding 23. The remainder of the cycle is similar to that described in connection with winding 23, thus an oscillation will be effectively produced by the alternate conduction and cut-off of each of the two transistors 3 and 4.

A somewhat more simplified explanation of the operation of the inverter circuit is as follows. Assume transistor 3 is conducting. This effectively places the input voltage (absent a consideration of transistor 45) across winding 23 resulting in a constant $d\phi/dt$. The polarity of the feedback windings holds transistor 3 conducting and transistor 2 cut-off. When the core 21 saturates $d\phi/dt$ falls to zero (reducing the feedback to zero) and then reverses because there is no conducting transistor to sustain the magnetizing current. This change in direction of $d\phi/dt$ induces a voltage of the opposite polarity in the transformer. This voltage turns transistor 2 on and holds transistor 3 off.

The above described inverter circuit in connection with the present invention is recognized to be old. One improvement in accordance with the present invention is the provision of a third transistor 45 in the inverter circuit A. The transistor 45 serves to control the output of the inverter circuit in the following manner. The power and frequency of the inverter circuit is determined in part by the base current of the two oscillating transistors 2 and 3. It is well known to control the base drive current by using a resistance voltage divider network. At low temperatures, that is, from 0° F. to −40° F., the old circuit using a voltage divider network has not proved to be satisfactory. That is, if the value of the resistors is chosen for proper operation at normal operating temperature, it will not function properly at such reduced temperatures. If, on the other hand, the values are changed for proper operation at reduced temperatures, the circuit will not operate properly at a higher temperature. This is believed to be due to the fact that the transistor characteristics vary with substantial temperature changes. Thus for proper operation, the bias should be varied for operation at a low temperature if originally set to a predetermined value at a high temperature, as the bias is fixed by the voltage divider network, the transistor will not have the proper bias at the changed temperature. That is to say, at lower than normal temperatures, the gain of the transistors vary. The new design, incorporating transistor 45, in accordance with the present invention permits uniform operation at any temperature in the range from −40° F. to +140° F. The inclusion of the transistor 45 further serves to provide protection against an inadvertent polarity reversal of the source 1 to keep this from burning out the transistors 2 and 3. Transistor 45 further serves to protect the transistors 2 and 3 against a possible short circuit at the output terminals 73 and 91. Additionally, the employment of transistor 45 in the manner hereinafter discussed protects the voltage regulator portion B of the circuit of the present invention against over heating which would otherwise occur if the input voltage should go too high.

Without the present invention compensation technique, as will hereafter be explained, if the input voltage should rise from 12 volts to approximately 13.5 volts for example, an increase of 1.5 volts over the normal 12 volts for a percentage increase of 12.5%, the power dissipation in the voltage regulator circuit B could increase as much as 300% (depending on the load on the power supply). Transistor 45 serves to compensate for any increase in the input voltage in the following manner. As the input voltage from source 1 increases, the emitter 47 of transistor 45 and therefore terminal 51 connected thereto will become more negative with respect to the base 46, thus decreasing the conduction of the transistor 45. This will serve to reduce the base drive current to transistors 2 and 3, thus serving to reduce the output voltage therefrom. This, in turn, will decrease the power dissipation in the voltage regulator circuit B.

Ordinarily, the emitter 47 of transistor 45 is positive with respect to its collector 48, that is at all times when transistors 2 and 3 are oscillating due to the current flow in the base circuits of transistors 2 and 3 which are both connected to terminal 51 through windings 22 and 25.

The feedback loop in the voltage regulator circuit functions as follows: Terminal 150 is coupled through Zener diode 76 to one of the output terminals 73 over lead 72. Terminal 151 is coupled to the other output terminal through thermistor 82 and lead 92. The potentiometer 80 including arm 83 is used to set the voltage at terminal 151 at a value close to but somewhat lower than that at terminal 150. Should the output voltage drop, due for example, to a loading of the output circuit, the voltage difference between terminals 150 and 151 varies (it is usually very small, i.e. of the order 0.05 volt), and this voltage difference drives amplifier transistor 86 which in turn drives the two push-pull transistors 94 and 98. Transistors 94 and 98 act in this circuit effectively as variable resistors which are controlled by amplifier 86. Power for transistors 94 and 98 as well as for transistor 86 is obtained from the magnetic circuit through windings 116 and 117 and includes rectifiers 123 and 124. Rectifiers 123 and 124 serve to rectify the voltage induced in windings 116 and 117 by reactor 64. The resistors 110 and 112 connected across transistors 94 and 98 serve to stabilize these transistors by providing a definite return path to provide a self-bias between the emitter and base of these two transistors. Thermistors 111 and 113 act to lower the effective resistance between the emitter and base of transistors 94 and 98 at higher temperature as the transistor characteristics vary. The resistor 103 stabilizes the operation of transistor 86 at temperatures above 100° F.

Returning to the operation of circuit B, it should be pointed out, that in order to maintain sufficient control it is necessary for the resistance from terminal 153 to 152 and from 152 to 154 to vary alternately and equally each half cycle. This variation of resistance is produced by the change in conduction from emitter to collector of transistors 94 and 98 caused by the direct current output variation of transistor 86. Transistors 94 and 98 act as alternate half wave resistors whose magnitude of resistance is controlled by the direct current output of transistor 86. When the polarity of the square wave on winding 118 is such that rectifier 123 is conducting, then transistor 94 draws current between emitter 96 and collector 97 so that this transistor acts as a resistance load on winding 116 of the magnetic regulator thereby controlling its regulating power. On the alternate half cycle, winding 117 has its polarity such that rectifier 124 is conducting and transistor 98 then acts as a resistance load on winding 117 of the magnetic regulator. This regulating system can be made to work also with a single winding, a single rectifier and a single transistor such as 94. The percent regulation will be excellent, but the efficiency of the inverter will be adversely affected because of the distortion created in one half cycle of the square wave. This distortion reaches the inverter system through the coupling between the magnetic regulator and the bridge rectifier which load the inverter transformer. The distortion occurs because only one half cycle of the square wave is loaded and controlled by a transistor. The result is that one transistor in the inverter will overheat while the other runs cool. As the potential of terminal 151 drops relative to terminal 150, the potential difference between these terminals serves to drive transistor 86 which in turn drives the two transistors 94 and 98 forcing them to draw more current from the rectifier circuit including diodes 123 and 124. This loads down the winding 118 which as has previously been mentioned, is wound on the same core 128 as is reactor 64. This serves to effectively reduce the reactance of the reactor 64 thereby increasing the output to the load, thus serving to maintain the output voltage at a constant level.

Again referring in detail to the amplifier 86, it should be mentioned that the capacitors 93 and 104 associated therewith serve to eliminate any pulsing which has a tendency to occur. They further serve to stabilize the feedback loop. The two resistors 105 and 106 which should be of a relatively low resistance, i.e. of the order of 10 ohms serve to equalize the input impedance of the transistors 94 and 98 if they are not perfectly matched.

The rectifier circuit including diodes 132 and 133 produces a direct current voltage which is applied between base 46 and emitter 47 of transistor 45. The polarity is such as to reduce the current through transistor 45 and consequently the base drive and output of inverter transistors 2 and 3 when the 12 volt battery is overcharged and rises as high as 13.5 volts. The capacitor 140 serves to filter direct current when the diode 132 is conducting. During the next half cycle, the capacitor 140 serves to filter the direct current when diode 133 is conducting.

When excessive input voltage from source 1 occurs, the dissipation of transistors 94 and 98 increases exponentially in relation thereto as previously mentioned. It has been found, for example, that an increase of 1.5 volts in the input manifests itself in an approximate 300% increase in the power dissipation by these two transistors. A voltage stepdown of approximately 5 to 1 from windings 116 and 117 to windings 126 and 127 produces a full wave rectified direct current of a polarity as shown between terminals 155 and 131 which is the reverse of the normal polarity of transistor 45 resulting in a decrease of conduction, thereby decreasing the output of the inverter circuit A.

In view of the above it may be seen that direct current is supplied to the regulator circuit B in a direction opposite the alternating current control of the very same regulator. Thus, the regulator receives power from the source being controlled while controlling this very source. This latter feature is believed to be novel.

There has thus been described a new and improved transistor circuit for regulating a direct current power supply.

What is claimed is:

1. A direct current power supply comprising: a source of direct current; a transistor switching system including a first and second transistor; a saturable core transformer having first, second, third, and fourth windings and an output winding; said transistors being adapted to alternately connect said first and second windings successively to said source of direct current; rectifier means coupled to said output winding; a saturable core reactor coupled to said rectifier means; a voltage regulator system coupled intermediate the output of said reactor means and the input of said transistor switching system; a third transistor, said third transistor being coupled between said third and fourth windings, said regulator system and said source of direct current, said source of direct current being connected to apply a reverse bias voltage to said third transistor; a pair of output terminals coupled to said regulator system, whereby a change in the magnitude of the voltage at said output terminals will be fed back through said regulator means to said third transistor to control the output of said transistor switching system to thereby maintain the output potential at said output terminals at a predetermined value.

2. A direct current power supply comprising: a source of direct current; a transistor switching system including a first and second transistor; a saturable core transformer having first, second, third and fourth windings and an output winding; said transistors being adapted to alternately connect said first and second windings successively to said source of direct current; rectifier means coupled to said output winding; a saturable core reactor coupled to said rectifier means; a voltage regulator system coupled intermediate the output of said reactor means and the input of said transistor switching system; a third transistor, said third transistor being coupled between said third and fourth windings, said regulator system and said source of direct current; a pair of output terminals coupled to said regulator system, whereby a change in the magnitude of the voltage at said output terminals will be fed back through said regulator means to said third transistor to control the output of said transistor switching system to thereby maintain the output potential at said output terminals at a predetermined value, said regulator means including a fourth and fifth transistor in push-pull arrangement whose resistance varies as a function of the output potential.

3. A direct current power supply comprising: a transistor circuit for producing a substantially square wave output signal in response to a direct current input signal; rectifier means coupled to the output of said transistor circuit; a voltage regulator circuit coupled to the output of said rectifier means, said regulator circuit including variable magnetic coupling means; a pair of output terminals to receive the output from said voltage regulator circuit; means for sensing a variation in the voltage of said output terminals from a predetermined value; means for amplifying said variation; and means for feeding the amplified signal from said last named means to said transistor circuit to vary the output of said transistor circuit in the direction opposite to said variation, said means for amplifying being powered by the output from said variable magnetic coupling means.

4. A direct current power supply comprising: a transistor circuit for producing a square wave output signal in response to the direct current input signal; rectifier means coupled to the output of said transistor circuit; a voltage regulator circuit coupled to the output of said rectifier means; a pair of output terminals to receive the output from said voltage regulator circuit; means for determining a variation in the voltage of said output terminals from a predetermined value; means for amplifying said variation and means for feeding the amplified signal from said last named means to said transistor circuit to vary the output of said transistor circuit in the direction opposite to said variation, said means for feeding including a pair of transistors in push-pull arrangement whose resistance varies as a function of the output potential, said means for amplifying being powered by the output from said transistor circuit; and transistor means coupled intermediate said means for feeding and said transistor circuit for producing a square wave output signal, said transistor means being adapted to vary the magnitude of said square wave output signal.

5. A direct current power supply comprising: a pair of input leads for receiving a direct current potential; a pair of input windings and output windings coupled to rectifier means; a saturable core reactor coupled to the output of said rectifier means; a first and second transistor coupled intermediate said input leads and said windings, said first and second transistors being adapted to alternately connect each of the input windings to said input leads; an output circuit coupled to said saturable core reactor, said output circuit including feedback means; a third transistor coupled intermediate said output circuit and the base of said first and second transistors, said input terminals being coupled to said third transistor to apply a reverse bias voltage thereto, said third transistor being adapted to vary the output of said first and second transistors in accordance with variations in the output circuit.

6. A direct current power supply comprising: a source of direct current; a transistor switching system including a first and second transistor; a saturable core transformer having first, second, third and fourth windings and an output winding; said transistors being adapted to alternately connect said first and second windings successively to said source of direct current; rectifier means coupled to said output winding; a saturable core reactor coupled to said rectifier means; a voltage regulator system coupled intermediate the output of said reactor means and the input of said transistor switching system; a third transistor coupled between said third and fourth windings, said regulator system and said source of direct current, said source of direct current being connected to apply a reverse bias voltage to said third transistor; a pair of output terminals coupled to said regulator system, whereby a change in the magnitude of the voltage at said output terminals will be fed back through said regulator means to said third transistor to control the output of said transistor switching system to thereby maintain the output potential at said output terminals at a predetermined value, said regulator means including at least one transistor whose resistance varies as a function of the output potential.

References Cited in the file of this patent

UNITED STATES PATENTS

| | | |
|---|---|---|
| 2,565,621 | Olson | Aug. 28, 1951 |
| 2,701,333 | Granger | Feb. 1, 1955 |
| 2,720,622 | Deuser | Oct. 11, 1955 |
| 2,783,380 | Bonn | Feb. 26, 1957 |
| 2,785,370 | Levy | Mar. 12, 1957 |
| 2,816,260 | Scorgie | Dec. 10, 1957 |
| 2,854,614 | Light | Sept. 30, 1958 |

OTHER REFERENCES

"Transistor Power Convertors," Hamlin, CQ, May 1958, pp. 42–43.

Bud Tomer: "Transistor Power Supplies," a pub. of CBS, Hystrom, Oct. 15, 1957. (Copy in Div. 48.)